March 17, 1925.

E. B. THURSTON 1,529,675

ELEVATOR MOTOR STARTING CONTROLLER

Filed Aug. 23, 1919    3 Sheets-Sheet 2

Ernest B Thurston, Inventor

By Geo E Kirk, Attorney

March 17, 1925.
E. B. THURSTON
1,529,675
ELEVATOR MOTOR STARTING CONTROLLER
Filed Aug. 23, 1919     3 Sheets-Sheet 3
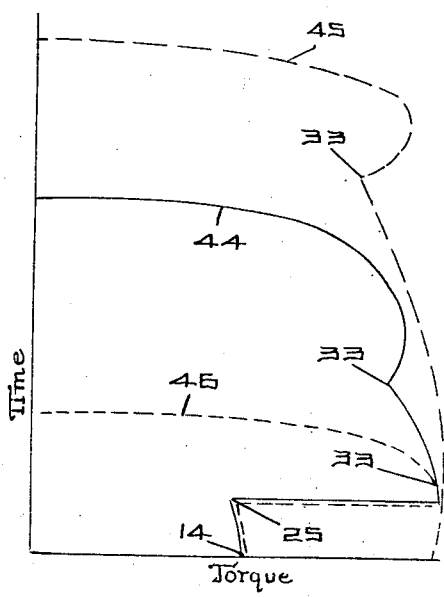
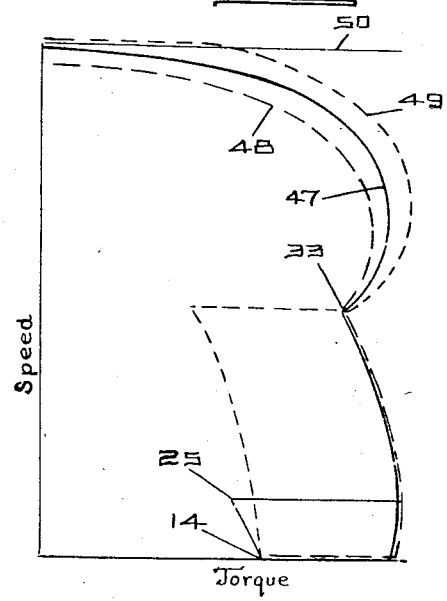
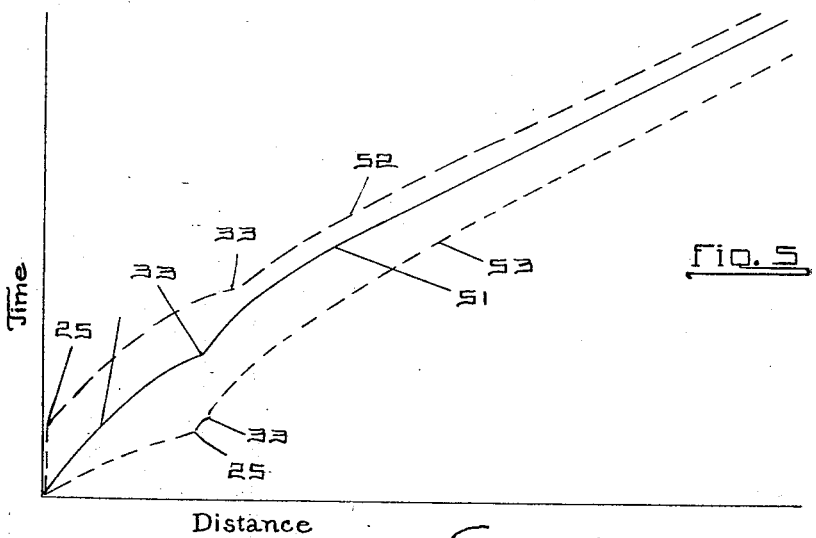
Ernest B Thurston Inventor
By [signature] Attorney Patented Mar. 17, 1925.

1,529,675

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

ELEVATOR-MOTOR STARTING CONTROLLER.

Application filed August 23, 1919. Serial No. 319,372.

*To all whom it may concern:*

Be it known that I, ERNEST B. THURSTON, a citizen of the United States of America, residing at Toledo, Lucas County, Ohio, have invented new and useful Elevator-Motor Starting Controllers, of which the following is a specification.

This invention relates to starting controllers, especially for electric prime movers.

This invention has utility more particularly when incorporated in connection with electric current motors of the alternating type for driving passenger elevators, especially in starting such elevators smoothly.

Referring to the drawings:

Fig. 3 is illustrative of the extreme starting conditions with the device herein as disclosed by time-torque curves;

Fig. 4 is illustrative of extreme starting conditions with the device herein as disclosed by speed-torque curves; and Fig. 5 is illustrative of extreme starting conditions with the device herein as disclosed by time-distance curves.

Figure 1:
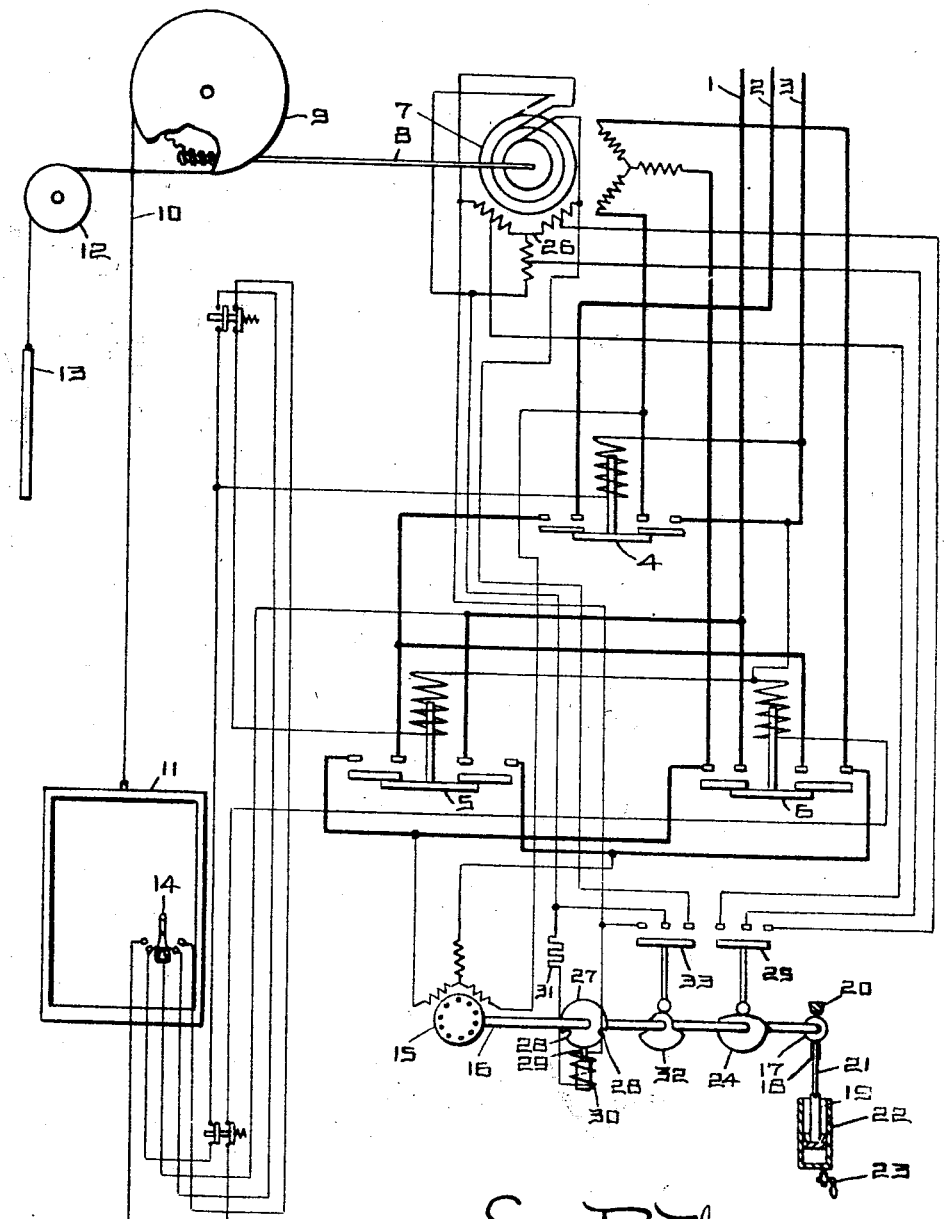
Fig. 1 is a wiring diagram of an embodiment of the invention in a three phase alternating electric current elevator installation having a torque motor for the control.

Three phase alternating current supply lines 1, 2, 3, may, by way of main switch 4 and up-switch 5 or down-switch 6, operate an elevator actuating motor 7 in up or down direction as elected. This main elevator motor 7 is on shaft 8 to drive drum 9 having cable 10 extending to elevator or car 11. An opposite reach of this cable 10 may pass over idler 12 to counter-weight 13.

In the elevator 11 is disposed a manually operable controller 14 which will in its operation determine the direction of elevator travel in controlling the switches 5 and 6 as well as the switch 4.

In the disclosure herein, there is automatic control operated by the controller 14 and shown as a squirrel cage motor 15 mounted on shaft 16 and carrying disc 17 having pin or projection 18 limiting the rotation of the shaft 16 and accordingly the oscillation or actuation of the motor 15 between lower or gravity position of weight 19 and fixed stop 20. The weight 19 is shown as at the position of rest and the stop 20 as the completed control throw actuation from the motor 15. In throwing the controller 14 in the car 11 in either direction the motor 15 at once tends to operate in one direction or the other. This operation causes a winding of a flexible cable 21 on the disc 17 and thereby tends to pull the weight 19 from dash pot 22 at a rate which may be regulated by leakage valve 23. This introduces a mechanical time lag or control in the rotation of the shaft 16.

Mounted on this shaft 16 is a cam disc 24 which in the starting or after a slight rotation of the shaft 16 will throw switch 25 and thereby cut out a part of secondary resistance 26 at the main motor 7. The proportion of this resistance which is cut out at motor 7 is designed to be such as will give the motor 7 a maximum torque. The throwing of the controller 14 cuts in the entire resistance 26. If the motor 7 does not pick up on this full resistance after a slight time interval, there will be a reduction in the resistance to increase the torque to a maximum starting torque by the automatic action of the switch 25.

On this shaft 16 is a third disc 27 herein shown as provided with a notch 28 in which may enter a dog or plunger 29 as a core of a solenoid 30 having a high non-inductive resistance 31 so that operation of the solenoid 30 will depend on voltage only and not be modified by the frequency drop. This solenoid 30 is energized in parallel with a portion of the resistance 26 not cut out by the switch 25. This solenoid 30 as a shunt winding from the resistance 26 normally tends to force core 29 into notch 28 and thereby hold the shaft 26 from further rotation. However, as the motor 7 speeds up, the voltage in this resistance 26 drops and accordingly the solenoid 30 is weakened so that this core 29 may fall away or work out of the notch 28 of the disc 27 and thus release the shaft 16. When the motor 7 has speeded up so that the solenoid 30, as adjusted by the non-inductive resistance 31, will release the disc 27, the shaft 16 will rotate sufficiently so that the disc 32 will operate the switch 33 in cutting out the balance of the resistance 26. With such speed control cut-out adjusted to occur say at half the rated speed for the motor 7, the torque would be built up or be increased at this complete cutting out of the resistance 26 and the motor would speed up and work around rated speed in its further operation as effected by the automatic stepping-up or control independent of the manual controller 14. The motor as so controlled is quiet in its action and smooth in its pick up. The steps are a minimum in number and as disposed effect the maximum capacity of operation for the motor. In fact, this capacity is a range increasing the efficiency of the motor and permitting a smaller motor installation than would be effective for a given load were the time feature of control used throughout or were the speed used throughout. The acceleration is handled in a minimum of time and the taking hold of the load is in a way working toward maximum efficiency in current consumption and in motor operation.

Figure 2:
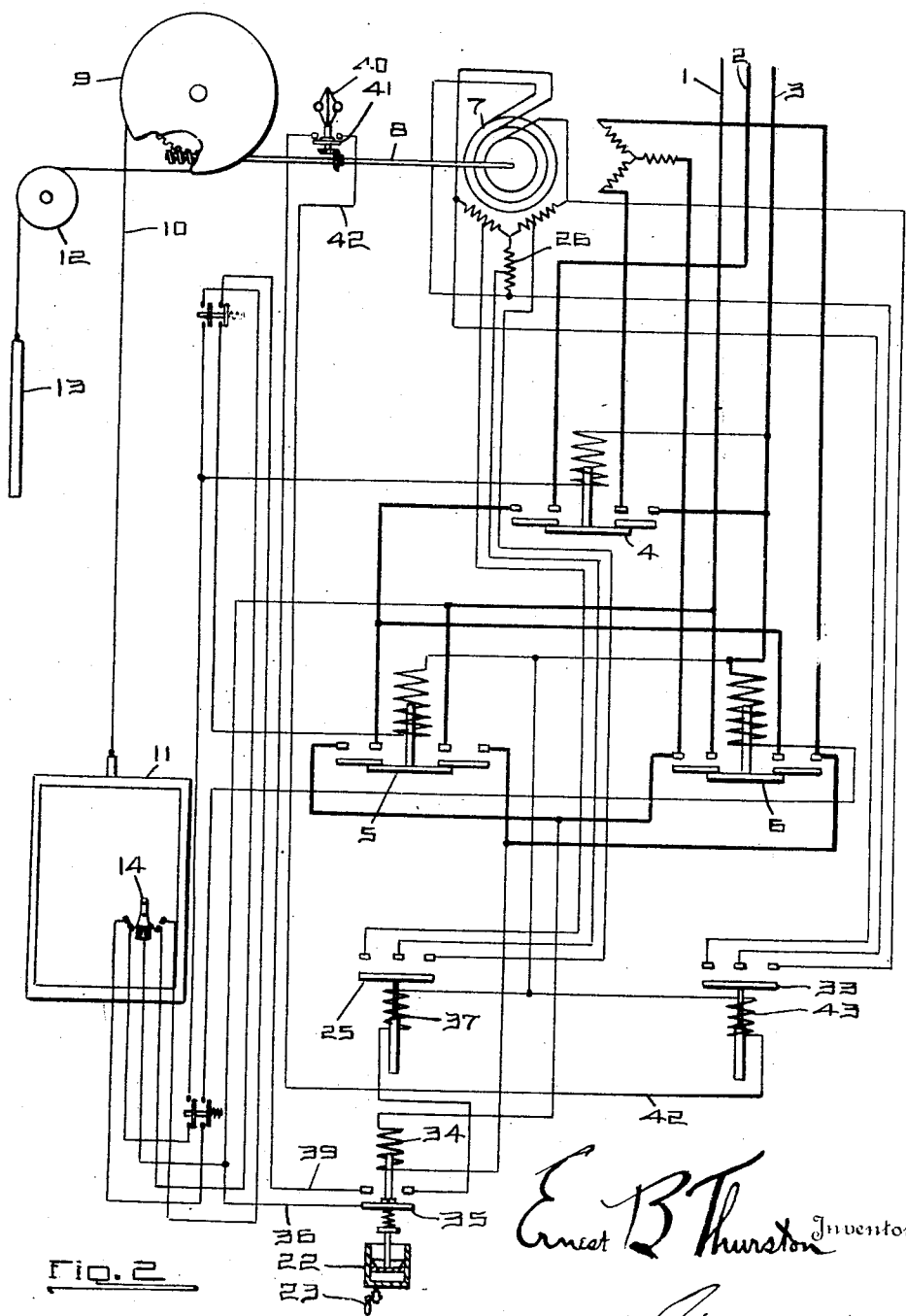
Fig. 2 is wiring diagram of an alternating electric current elevator motor installation wherein the control is effective by a dash pot directly and a speed governor.

Instead of the electrical feature of speed control from the motor 7 there is shown in Fig. 2 a mechanical speed control. A solenoid 34 is provided to operate the dash pot 22 and this solenoid is designed to carry a contact 35 which, in the lag or delayed time for control of the dash pot 22, will connect line 36 to energize solenoid 37 for switch 25 in cutting out a portion of the resistance 26 at the maximum torque actuation for the motor 7 from starting position. As herein designed there must be a flow or cut out of the first step before there can be the subsequent cut out of the final or full amount of the resistance 26 for the terminal 35 must be thrown to permit the current flow by line 39 to fly-ball governor or speed controller device 40 connected to be driven from shaft 8 of the motor 7. As the fly-ball governor 40 comes up to speed, it brings up contact 41 to permit current flow by line 42 to energize solenoid 43 and throw switch 33 for cutting out the remainder of the resistance 26. Accordingly, here as in the showing in Fig. 1, there is a full resistance for the starting of the motor 7 when controller 14 in the car 11 is manually thrown. Thereafter automatically there is time lag for cutting out a portion of the resistance at maximum torque position for the motor 7 which, if the motor 7 has not picked up, will give a maximum torque to effect a pick up from starting position, or if the motor has picked up, it will give the maximum torque for speeding up the motor. When the motor has speeded up, then at a determined speed of the motor there is a cutting out of the balance of the resistance which occurs only at an adjusted or determined speed for the motor 7 and cannot occur before the first or maximum torque cut-out. Accordingly, there is insured a sequence from the maximum torque at starting position thus insuring that the motor is going to pull at starting a maximum load and handle such at a maximum speed of acceleration.

Time torque in Fig. 3 by curve 44 illustrates the action of the controller under the combined manual throw-in of controller 14, the delayed time controlling of switch 25, and the speed throwing in of switch 33. In the extreme condition of heavy load up or light load down in the starting, the curve 45 is illustrative of the stepping-up starting controller, while curve 46 illustrates the condition of a heavy load down or a light load up.

On a torque-speed curve there is illustrated in Fig. 4 the average load condition by curve 47, the heavy load up condition by curve 48 which corresponds to the light load down, and curve 49 illustrates the heavy load down and the light load up. The line 50 may be considered as illustrating the synchronous speed line for the motor.

In Fig. 5 the time-distance curves are shown as curve 51 corresponding to the average load condition, curve 52 corresponding to the heavy load up or the light load down starting condition, and curve 53 corresponding to the heavy load down and the light load up starting condition. These curves probably illustrate more clearly the smooth action of the motor in coming up to speed. By a simple mechanism quiet in operation there is resultant an efficient handling of the motor by a simple controller in the car with automatic sequence thereafter which sequence corresponds to the maximum efficiency in the handling of the motor. Curves 51, 52, 53, are each ideal for a smooth quiet starting in picking up the elevator. There is no jerk in the starting of a light load up. The heavy load up does not draw excessive current. The motor is automatically adapted to the wide variations for a quiet and smooth pick up and operation for a quick acceleration in a minimum of time. As herein disclosed, the mechanisms or steps are reduced to a minimum. The maximum torque controlled through the switch 25 is the torque which it is desired to handle under the maximum demand for the motor. However, in instances where there is a lighter demand, the switch 14 may be effective in getting the load under way so that when the time lag of switch 25 comes into action, there is not a quick jerk on the elevator. With this maximum pull passing as the elevator speeds up, switch 33 comes into play, but only comes into play after the time has been effective in operating the switch 25 with the appreciable lag after the throwing in of switch 14. The interval between these two switches may be very small as illustrated in curve 53. However, it is such that always the switch 25 acts before the switch 33 comes into play. This insures that the resistance will not be all cut out until the motor has headway and it further insures that there will not be a lower starting torque in reducing the capacity of the motor in picking up heavy loads for lifting.

What is claimed and it is desired to secure by Letters Patent is:

1. An electric elevator, a motor therefor, power windings for the motor, main and direction switches for the elevator motor power windings, a manually operable controller in the elevator for said switches, normal starting resistance for the motor independently of said switches and windings, devices for modifying the influence of the controller embodying a time control cut-out for a portion of the resistance, a speed control cut-out for a second portion of the resistance, and connections from the motor operable only after the motor has started independently of the power windings for delaying the operation of the speed control cut-out to follow the time control cut-out.

2. An elevator, a motor therefor, power windings for the motor, main and direction power switches for the windings, normal starting resistance independent of said windings and switches, a cut-out switch for a portion of said resistance embodying a definite lag means after said power switch operation for giving a maximum starting torque to the motor, an additional switch for holding the remaining portion of the resistance in, and controlling means from the motor independent of said windings operable only after the motor has started for opening said last switch.

3. A motor having a power field winding, switches for said winding, a normal starting resistance extending to the motor independently of said winding and having three control points, starting means for the motor operating on the first point on said resistance as said switches are operated for said winding for normal acceleration of the motor, means after a time interval operating on the resistance to a second point of said resistance approximating the condition of maximum torque for the motor and third means operable only after the motor has started and operable from the motor independently of said winding for operating on a third position for fully cutting out the resistance.

4. A motor, power windings therefor, switch means for said windings, a normal starting resistance extending to the motor independently of said windings and switch means and having a first resistance point, a second point coacting for a maximum torque of the motor, and a third fully cut-out point, starting means for the motor coacting to operate said switch means and place the motor on maximum resistance, first control means independent of the motor for placing said resistance at the second point whether or not the motor picks up on the resistance of said first point, and second control means provided with connections operable only after the motor has started and operable from the motor independently of said switch means and power windings for cutting out the balance of the resistance.

5. A motor having a power winding, a normal starting resistance for the motor independent of said winding and having a first resistance point, time and speed control points, and control devices independent of said power winding for placing said resistance at said two later points in operating the motor, said devices including connections permitting operation at the speed control point only after the motor has started.

6. A motor having a power winding, a starting resistance for said motor independent of said winding, and having a normal resistance point, a point coacting for maximum torque of the motor and a fully cut-out point, starting means for the motor, time control means operable on definite lag after the starting means and independent of motor pick-up for placing said resistance in the point for maximum torque, and motor speed control means independent of said power winding provided with connections operable only after the motor has started and operable independently of time interval after maximum starting torque position for the motor for fully cutting out the resistance for giving the motor increased torque in operation.

7. A motor having a power winding, normal starting resistance for the motor, said resistance having an intermediate point of maximum torque for the motor, a less resistance point thereafter, and control means independent of said power winding for the torque and less resistance points, said means including connections cutting in the intermediate point and operating the less resistance point control thereafter only after the motor has started.

8. A motor, a power winding for the motor, normal starting resistance for the motor, said resistance having an intermediate point of maximum starting torque for the motor, a less resistance point thereafter, and control means independent of said power winding provided with connections operable only after the motor has started for holding the less resistance point disconnected until the torque point is closed.

9. A motor, controlling mechanism therefor including a first resistance providing acceleration for normal load picking up of the motor, a second resistance providing a maximum torque for the motor and normally coacting for further acceleration of the motor after the initial pick-up effected by said first acceleration resistance, and a controller provided with connections for throwing in said first resistance, a time lag first automatically controlled switch changing said motor from said first resistance to said second resistance whether or not the motor has started and thereby connecting said motor maximum torque to get the motor either started or accelerated, a motor speed second automatically controlled switch for cutting out said second resistance, and connections maintaining the sequence of the second automatic switch as after said first automatic switch and after the motor has started.

In witness whereof I affix my signature.

ERNEST B. THURSTON.